July 6, 1926.
J. TESSIER
1,591,500
FILM SPLICER
Filed June 8, 1923
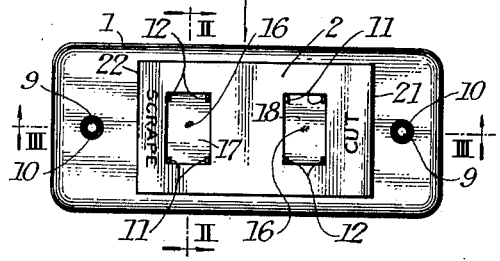
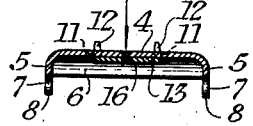
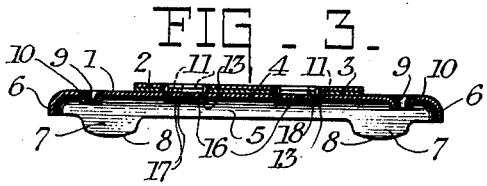
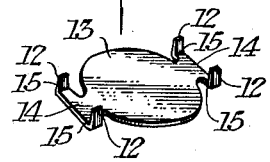
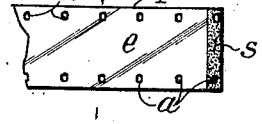
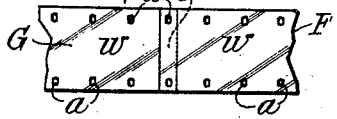
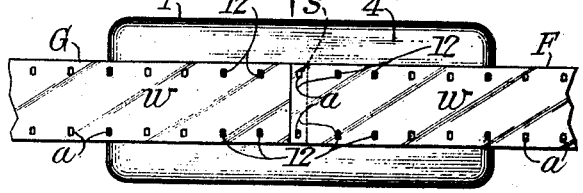
INVENTOR,
Julien Tessier,
BY
ATTORNEYS.

Patented July 6, 1926.

1,591,500

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

FILM SPLICER.

Application filed June 8, 1923. Serial No. 644,241.

This invention relates to photography and more particularly to photographic film splicing machines, such as are used in joining strips of motion picture film. One object of my invention is to provide a simple, cheap and effective splicing block particularly adapted for use by amateurs; another object is to provide a block which will accurately space the ends of the film strips so as to insure proper spacing and alignment of the film perforations; another object is to provide plates adapted to cooperate with the block, one being used as a cutting and scraping gauge and the other being used for the scraper; another object is to provide a means for registering the gauge plate properly on the block; and other objects will appear hereinafter from the specification, the novel features being particularly pointed out in the claims at the end thereof.

In the drawings, wherein like reference characters denote like parts throughout:

Fig. 1 is a plan view of a splicing outfit constructed in accordance with and illustrating one form of my invention;

Fig. 2 is a section on the line II—II of Fig. 1, parts being omitted;

Fig. 3 is a section on line III—III of Fig. 1;

Fig. 4 is an enlarged detail perspective view of a pin carrying plate;

Fig. 5 is a plan view of the splicer with a film positioned for cutting;

Fig. 6 is a plan view of the film after cutting;

Fig. 7 is a plan view of the film being scraped, the scraper being shown in perspective;

Fig. 8 is a plan view of the scraped film;

Fig. 9 is a plan view of the two films positioned on the block being cemented together; and Fig. 10 is a plan view of the cemented film.

My outfit consists of a joining block 1 with two gauge plates 2 and 3. As these plates are identical, the parts of each will be similarly designated by the same reference characters.

The block 1, as shown in the first four figures, consists of a plate 4, formed over at the edges to make sides 5 and ends 6, portions of the sides 7 being elongated to provide legs. These legs are preferably rounded slightly on the bottom at 8 so as to make a firm support. Two apertures 9 with formed-in flanges 10 are provided for screws, by which the plate may be fastened to a table or upon any other desired support. Two series of four apertures each, all symmetrically arranged and designated by numeral 11, provide guideways for the pins 12.

These pins are preferably formed in sets of four upon single plates 13, which may consist, as shown in Fig. 4, of a plate 13 having arms 14 extending across opposite ends. The ends of arms 14 are bent at 15 to provide the pins 12.

The block is assembled by placing two of the plates 13 with the pins 12 extending through the apertures 11 and spot welding each plate 13 at 16 to plate 4. Since the apertures 11 can be accurately made in the single operation, the proper spacing of pins 12 is assured.

Gauge plates 2 and 3 are identical and may be interchangeably used. Each plate is rectangular in shape having two cut-outs 17 and 18. Each cut-out is of such a size that the sides 19 and ends 20 thereof closely engage a set of four pins 12 (Fig. 5) thus accurately locating the plate upon the block 1. The ends of each plate, 2 or 3, are unsymmetrically arranged relative to the cut-outs, being spaced from the pins 12. One end 21 (on which the word "Cut" is preferably marked) forms a guide for cutting of the film F in proper relation to the apertures $a$. The other end 22 is shorter from the edge to the pins 12 than end 21, and is preferably marked "Scrape".

As will be seen from Figs. 5 and 6, end 21 is located at the right hand end of block 1 with the emulsion side $e$ of the film F facing up, and the end $f$ is then cut off using the edge 21 as a straight edge. A knife or any other desired cutter may be used.

In Figs. 7 and 8 the plate 2 has been reversed and end 22 forms a gauge leaving a portion $p$ of the film, from which the emulsion coating $e$ is scraped leaving the bare support $s$. The edge of plate 3 can be conveniently used for this operation.

The next step is to cut the end of a film G to be joined to the first film F. For this purpose edge 21, labeled "Cut", is used as before, but the emulsion is not scraped.

As shown in Figs. 9 and 10, the film G is then laid on block with the uncoated side $w$ facing up, and with one set of perforations extending beyond the ends of a pin set 12 with the pins engaging apertures of the film. Film F is then taken and the scraped portion *s* coated with any suitable cement after which it is laid on block 1 and with apertures *a* engaging pins 12 in such a manner that the film F will overlie film G a distance equal to the portion *s* previously scraped and coated with cement. By holding these overlying portions in contact for a moment, they are firmly united with each strip in proper alignment and with the apertures *a* correctly spaced.

It is, of course, possible to handle the film as to cutting, scraping and cementing in different order of steps or with a different side of the film facing up for different steps. I find, however, that the above described series of operations is entirely satisfactory and that it will produce strong uniform joints. While to be preferred, I do not wish to be limited to the described steps, as they are cited as illustrative only.

As modifications can be made in my splicer without departing from my invention, I include as within the scope of my invention all such changes as come within the following claims.

Having thus described my invention, what I claim as new and desire to secure by Letters Patent is:

1. In a film splicer, the combination with a film-supporting block including a plate having pins extending upwardly therefrom for locating a perforated film thereon, of a plate having cut-out portions therein adapted to engage a plurality of pins carried by the block, and to be definitely located thereby upon the block, the plate also having ends differently spaced from the cut-out portions, one end being adapted to form a straight edge for cutting the film, the other end forming a scraping guide, whereby a predetermined film area may be prepared for splicing.

2. In a film splicer, the combination with a block having a series of symmetrically arranged pins extending therefrom, of a plate having a cut-out portion adapted to cooperate with the pins, two edges of the plate being unequally spaced from the cut-out portion, one edge forming a guide for cutting a film positioned by the pins on the block, and the other edge forming a guide for scraping a surface of the film to be cemented, whereby a predetermined film area is prepared for splicing.

3. In a film splicer, the combination with a block having a series of symmetrically arranged pins extending therefrom, of a plate having a cut-out portion adapted to cooperate with the pins, to locate the plate upon the block, two edges of the plate being unsymmetrically arranged with respect to the locating cut-out portion, so that the edges form guides which predetermine the location of the cutting and scraping operations used preparatory to splicing the film.

4. In a film splicer, the combination with a block having two series of symmetrically arranged pins extending therefrom, of a plate having cut-out portions adapted to cooperate with and to be located by the pins, portions of the plate being unsymmetrically arranged relative to the cut-out portions and arranged to form guides for cutting and scraping a film positioned by the pins, the location of these operations being such that two films prepared for splicing with the guiding plates may be located for splicing, one on one set of pins, and the other on the other set of pins, with the film edges in a predetermined overlapping position.

Signed at Rochester, New York, this 4th day of June 1923.

JULIEN TESSIER.